Figure 1:
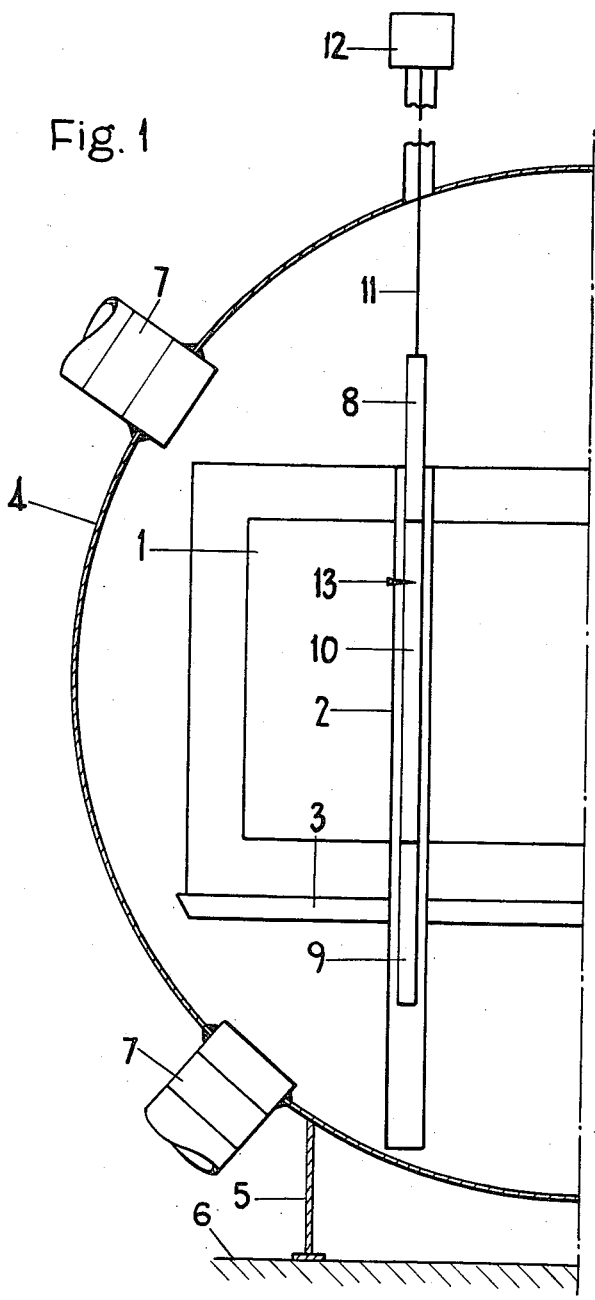

March 12, 1963 P. J. GRANT 3,081,248
NUCLEAR REACTORS
Filed March 26, 1959 2 Sheets-Sheet 1

INVENTOR
PETER JOHN GRANT
BY Kirschstein, Kirschstein & Ottinger
ATTORNEYS

March 12, 1963  P. J. GRANT  3,081,248
NUCLEAR REACTORS
Filed March 26, 1959  2 Sheets-Sheet 2

INVENTOR
PETER JOHN GRANT
BY Fischlein, Fischlein & Ottinger
ATTORNEYS

United States Patent Office 3,081,248
Patented Mar. 12, 1963

3,081,248
NUCLEAR REACTORS
Peter John Grant, Longfield, England, assignor to The General Electric Company Limited, London, England
Filed Mar. 26, 1959, Ser. No. 802,061
Claims priority, application Great Britain Mar. 31, 1958
5 Claims. (Cl. 204—193.2)

The present invention relates to nuclear reactors of the kind having a moderator associated with, or adapted to be associated with, fissible material.

The invention is applicable, for example, to nuclear reactors of the kind having a moderating core in which fuel elements are adapted to be located. The neutron flux in the core of such a reactor varies from the centre of the core to its boundary, and if the core is of the type having axial symmetry, as with a cylindrical core, the neutron flux varies in the axial direction from a minimum at each end to a maximum at the centre.

Some of the fission products formed in such reactors, particularly $Xe^{135}$ have a very high capture cross section for slow neutrons, and these tend to have a long term stabilising effect on the neturon flux distribution since if there is an increase in the flux in one part of the core there is an increase in the amount of $Xe^{135}$ produced and this tends to reduce the flux again locally. The total flux is controlled by retarders, or control rods, which are inserted into the core axially.

However, in larger reactors than those constructed hitherto there is a likelihood that an unstable, and possibly oscillatory, distortion of the neutron flux in the axial direction will occur since an increase in neutron flux leads to the "burn-out" of $Xe^{135}$ (produced by radioactive decay of $I^{135}$), releasing reactivity which leads to a further flux distortion and so on. In the course of time the concentration of $Xe^{135}$ returns to equilibrium with the new flux level, when the whole process is reversed. The likelihood of a flux distortion is increased if there is a positive coefficient of reactivity associated with either fuel or moderator temperature. This distortion takes the form of an increase of flux towards one end of the reactor and a decrease of flux towards the other end.

It is an object of the present invention to provide means for correcting such flux distortion in a reactor core.

According to one aspect of the present invention, in a nuclear reactor of the kind having a moderator associated with, or adapted to be associated with, fissile material, means are provided for controlling the distribution of the neutron flux in the moderator, said means comprising a pair of neutron absorber members adapted to be inserted into different parts of the moderator and linked or coupled whereby movement of one member into, or out of, the moderator is accompanied by a corresponding movement of the other member out of, or into, the moderator, the arrangement being such that by the differential movement of the two members the fluxes in the said two parts of the moderator can be relatively adjusted without substantially affecting the total flux.

According to another aspect of the present invention, in a nuclear reactor of the kind having a moderating core in which fuel elements are adapted to be located, means are provided for controlling the distribution of the neutron flux in the core, said means comprising a pair of neutron absorber members adapted to be inserted into different parts of the core and linked or coupled whereby movement of one member into, or out of, the core is accompanied by a corresponding movement of the other member out of, or into, the core, the arrangement being such that by the differential movement of the two members the fluxes in the said two parts of the core can be relatively adjusted without substantially affecting the total flux.

Thus the said means may comprise a control rod extending through an axial passage in the moderating core, the rod having two end sections of neutron-absorbing material connected by an intermediate section which is relatively nonabsorbent to neutrons.

Two arrangements in accordance with the present invention will now be described, by way of example, with references to the accompanying schematic drawings, in which each figure shows, in section, a fragmentary view of a moderator core and one means for controlling the flux distribution in the core.

Referring to FIGURE 1 of the drawings, a nuclear reactor comprises a moderating core 1 in which fuel elements (not shown) are located, the core being cylindrical and having passages such as 2 extending therethrough parallel to the axis. The core is mounted on a support structure 3 within a pressure vessel 4, the pressure vessel being supported on an annular skirt 5 connected to a base 6. Pipes 7 for circulating gaseous cooling medium under pressure are welded into the vessel 4.

In order to correct for distortion of the neutron flux in the core in the axial direction, which distortion would take the form of a flux increase towards one end of the core relatively to the other end, a control rod 13 extends through the passage 2. This control rod is in three sections, an end section 8 of material which is highly absorbent to neutrons, such as boron, cadmium or gadolinium, an end section 9 of the same material, and an intermediate section 10 connecting the two end sections, the section 10 being relatively nonabsorbent to neutrons. Each of the end sections 8 and 9 is normally disposed adjacent to one end of the passage 2 and is adapted to be inserted into the core at that end so as to act as a neutron absorber member in the manner of a conventional control rod. It will be seen however that movement of one section into the core is accompanied by a corresponding movement of the other member out of the core so that the flux at the two ends of the core is controlled differentially by movement of the rod 13, the relative flux of the two ends being varied while the total flux remains substantially constant.

In order to effect such movement of the control rod, the rod is suspended by a cable 11 from an electric motor-driven winch 12. It is to be understood, of course, that in practice there will be many such control rods each cooperating with a passage such as 2 and arranged in the manner of the control rod 13.

When the flux distribution is symmetrical, that is when there is no flux distortion, the two neutron absorber members would be adjacent to the ends of the passage 2 as shown in the drawing; but if the flux towards one end of the core should increase while the flux towards the other end decreases, the rod 13 would be moved so as to insert the neutron absorber member at the one end farther into the passage 2 in the core whereby the increased neutron flux towards that end would be reduced, and simultaneously the other retarder member would be withdrawn from the passage to a corresponding extent thus enabling the decreased neutron flux at that end to build up.

Figure 2:
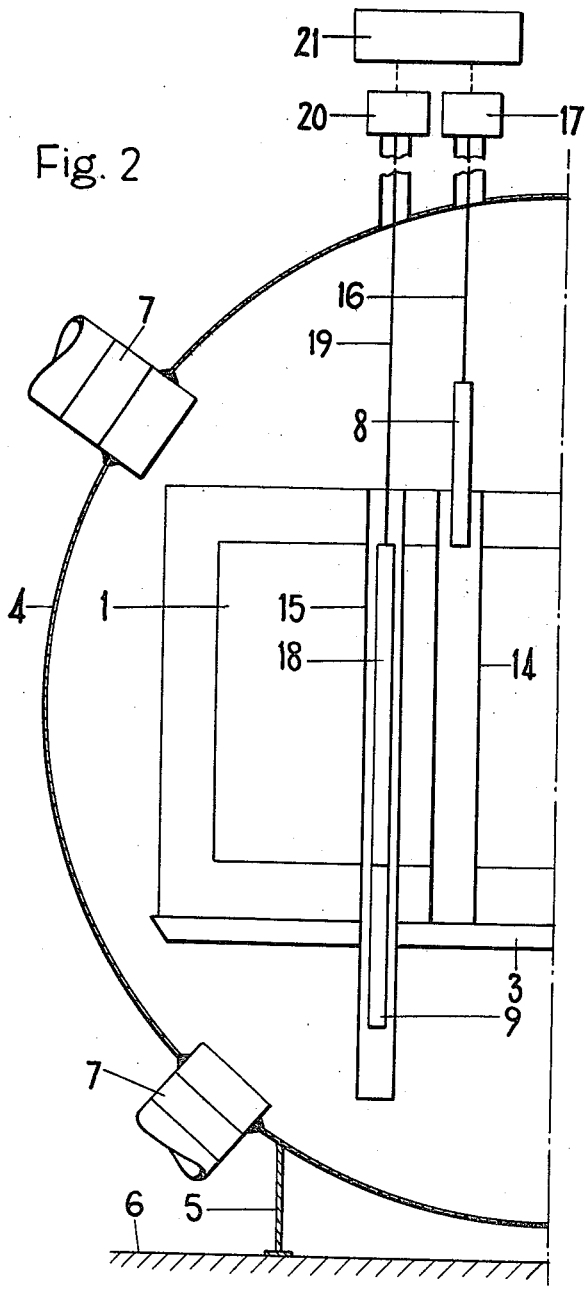

Referring now to FIGURE 2, which illustrates a modified arrangement, the neutron absorber members 8 and 9 are arranged to cooperate with two separate passages 14 and 15 in the core 1. The retarder member 8 is supported by a cable 16 from an electric motor driven winch 17, and the retarder member 9 is connected to a section 18 of material which is relatively non-absorbent to neutrons, this section being supported by a cable 19 from an electric motor driven winch 20. The winches 19 and 20 may be mounted on a common shaft and driven by the one electric motor, but in the arrangement illustrated the winches are separately driven, their respective motors being controlled by a common control device 21 operative to control the motors in such a manner that any movement of one retarder member in its passage is accompanied by a corresponding movement of the other member such that there is no net change of neutron flux in the core.

It will be seen that with the arrangements described above, the over-all reactivity change due to movement of the control is small since movement of the two neutron absorber members with respect to the core is made differentially; moreover it is never necessary to move the control rod through large distances. On the other hand, if a control rod of conventional construction were to be used for correcting flux distortion, it would be necessary to be above to move the rod from one end of the core to the other and such movement of the rod through the core would seriously affect the total reactivity.

I claim:

1. In a nuclear reactor having an active portion comprising fissile material and moderating material, said active portion having an axis of symmetry and the volume of said active portion being such that the neutron flux can be asymmetrically distributed between the two outer antipodal regions of said active portion in the direction of said axis in a manner such that there is an increase in reactivity at one such outer region and a corresponding decrease in reactivity at the antipodal region, means for correcting such asymmetrical flux distribution, said last-named means comprising means providing openings in said antipodal regions and a pair of neutron absorber members extending into said openings of the active portion respectively, and motive means coupled with said members in a manner to move said members simultaneously into and out of said openings in said antipodal regions respectively.

2. In a nuclear reactor having an active portion comprising a moderating core and fuel elements located in said core, said active portion having an axis of symmetry and the volume of said active portion being such that the neutron flux can be asymmetrically distributed between the two outer antipodal regions of said active portion in the direction of said axis in a manner such that there is an increase in reactivity at one such outer region and a corresponding decrease in reactivity at the antipodal region, means for correcting such asymmetrical flux distribution, said last-named means comprising means providing openings in said antipodal regions and a pair of neutron absrober members extending into said openings of the active portion, respectively, and motive means coupled with said members in a manner to move said members simultaneously into and out of said openings in said antipodal regions respectively.

3. In a nuclear reactor having an active portion comprising a moderating core and fuel elements located in said core, said active portion having an axis of symmetry and the volume of said active portion being such that the neutron flux can be asymmetrically distributed between the two outer antipodal regions of said active portion in the direction of said axis in a manner such that there is an increase in reactivity at one such outer region and a corresponding decrease in reactivity at the antipodal region, means for correcting such asymmetrical flux distribution, said last-named means comprising means providing parallel passages in said active portion and extending through said antipodal regions, control rods within said passages, and motive means for moving said control rods along said passages, each said control rod comprising a pair of end sections of neutron-absorbing material cooperating with the ends of one of said passages, and an intermediate section connecting said end sections, said intermediate section being relatively non-absorbent to neutrons.

4. In a nuclear reactor having an active portion comprising a moderating core and fuel elements located in said core, said active portion having an axis of symmetry and the volume of said active portion being such that the neutron flux can be asymmetrically distributed between the two outer antipodal regions of said active portion in the direction of said axis in a manner such that there is an increase in reactivity at one such outer region and a corresponding decrease in reactivity at the antipodal region, means for correcting such asymmetrical flux distribution, said last-named means comprising means providing pairs of parallel passages in said active portion extending through said antipodal regions, pairs of neutron absorber members cooperating respectively with said passages adjacent opposite sides of said active portion, and motive means coupled with said members in a manner to move the members simultaneously into and out of said active portion respectively.

5. In a nuclear reactor having an active portion comprising a cylindrical core of moderating material and fuel elements located in said core, said active portion having an axis of symmetry and the volume of said active portion being such that the neutron flux can be asymmetrically distributed between the two outer antipodal regions of said active portion in the direction of said axis in a maner such that there is an increase in reactivity at one such outer region and a corresponding decrease in reactivity at the antipodal region, means for correcting such asymmetrical flux distribution, said last-named means comprising means providing openings in said antipodal regions in a direction parallel to the axis of said active portion and a pair of neutron absorber members extending into said openings, and motive means coupled with said members in a manner to move said members simultaneously into and out of the respective openings.

References Cited in the file of this patent
UNITED STATES PATENTS

| | | |
|---|---|---|
| 2,856,336 | Metcalf | Oct. 14, 1958 |
| 2,867,727 | Welker et al. | Jan. 6, 1959 |
| 2,892,765 | Young | June 30, 1959 |
| 2,898,281 | Untermyer et al. | Aug. 4, 1959 |
| 2,900,316 | Kaufman et al. | Aug. 18, 1959 |